United States Patent [19]

Sadiq et al.

[11] Patent Number: 5,991,766
[45] Date of Patent: Nov. 23, 1999

[54] METHOD AND SYSTEM FOR MANAGING REDUNDANT OBJECTS IN A DISTRIBUTED OBJECT SYSTEM

[75] Inventors: Waqar Sadiq, Rochester Hills; Fred Arthur Cummins, Farmington Hills, both of Mich.; William Earl Swift, II, Frisco, Tex.

[73] Assignee: Electronic Data Systems Corporation, Plano, Tex.

[21] Appl. No.: 08/982,338

[22] Filed: Dec. 2, 1997

[51] Int. Cl.$^6$ .................................................. G06F 15/163
[52] U.S. Cl. ........................... 707/103; 707/10; 707/102; 707/204; 395/200.31; 395/200.47; 395/682; 395/683; 395/800.29
[58] Field of Search ............................ 707/10, 102, 103, 707/204; 395/200.31, 200.47, 683, 800.29, 682

[56] References Cited

U.S. PATENT DOCUMENTS

| | | | |
|---|---|---|---|
| 5,553,223 | 9/1996 | Greenlee et al. | 345/333 |
| 5,588,147 | 12/1996 | Neeman et al. | 707/1 |
| 5,613,079 | 3/1997 | Debique et al. | 711/141 |
| 5,617,537 | 4/1997 | Yamada et al. | 395/200.44 |
| 5,724,575 | 3/1998 | Hoover et al. | 707/10 |
| 5,812,779 | 9/1998 | Ciscon et al. | 395/200.53 |
| 5,842,173 | 11/1998 | Strum et al. | 705/1 |
| 5,870,742 | 2/1999 | Chang et al. | 707/8 |
| 5,874,954 | 2/1999 | Kilmer et al. | 345/333 |
| 5,884,324 | 3/1999 | Cheng et al. | 707/201 |
| 5,887,171 | 3/1999 | Tada et al. | 707/4 |

OTHER PUBLICATIONS

Naya et al., "Object–oriented development based on polymorphism patterns and optimization to reduce executable code size", Proceedings Technology of object–oriented languagesb and systems, Tools: IEEE Comput. Soc, Abstract only, 1998.

Kim, et al, "Software fault tolerance for distributed object based computing", Journal of Systems and Software, vol.39, No.2, Abstract Only, Nov. 1997.

Metsker, S. J., "Thinking over objects", Object Magazne, vol.7, No.3, Abstract Only, May 1997.

Lopes, C. V., "Graph–based optimizations for parameter passing in remote invocations", Proceedings Furth International Worksop on object–Orientation in Operating Systems, IEEE Comput Soc Press, Abstract Only, Aug. 1995.

Huang, S., "Developping distributed applications by semantics–based automatic replication", Proceedings First Asia–Pacific Software Engineering Conference, IEEE Comput. Soc. Press, Abstract Only, Dec. 1994.

Gianuzzi, V., "Coupling algorithms for replicated objects and processes", Microprocessing & Microprogramming, Conference: 20th Annual Euromicro Conference, System Architecture and Integration, Abstract Only, Sep. 1994.

Bal, et al., "Replication techniques for speeding up parallel applications on distributed systems", Concurrency: Practice nad experience, vol.4, No.5, Abstract Only, Aug. 1992.

Alan, T., "Preventing state divergence in replicated distributed programs", Proceedings—Symposium on reliability in distributed software nad database systems, IEEE Service Center, Abstract Only, Oct. 1990.

Primary Examiner—Jean R. Homere
Attorney, Agent, or Firm—L. Joy Griebenow; Baker & Botts L.L.P.

[57] ABSTRACT

One aspect of the invention is a method for managing redundant objects in a distributed object system. A transaction service runs on a computer. At least two copies of the instance variables of a distributed object are maintained in a separate database. The distributed object (46) has a polymorphism of an interface object instantiation method. At least two copies of an interface object (48) are instantiated wherein each interface object (48) is associated with one of the copies of the instance variables of the distributed object (46). The interface objects (48) are instantiated using the polymorphism. A list of interface objects (48) is maintained with the distributed object (46). Each copy of the instance variables of the distributed object (46) are modified by traversing the list of interface objects (48) and sending a message with modification parameters to each interface object (48) on the list.

18 Claims, 2 Drawing Sheets

METHOD AND SYSTEM FOR MANAGING REDUNDANT OBJECTS IN A DISTRIBUTED OBJECT SYSTEM

TECHNICAL FIELD OF THE INVENTION

This invention relates generally to object-oriented programming and more particularly to a method and system for managing redundant objects in a distributed object system.

BACKGROUND OF THE INVENTION

In distributed systems developed using object-oriented programming (commonly referred to as distributed object systems) it may not always be sufficient to have a single copy of an object for the distributed system. An object may be stored in multiple databases simultaneously. For example, there may be a period of time where a legacy system is being replaced by a new system. In such a case, separate copies of the same object may be stored in both the old database and a new database. As another example, one may want to have multiple copies of a particular object for business reasons. For example, each branch office of a business may want to have a copy of objects representing a customer account but a copy of all accounts from all branch offices might be maintained in a database at the headquarters of the business.

Unfortunately, particular distributed objects in a distributed system may be maintained in varying numbers of databases. For example, one type of object might be maintained in three different databases while another type of object might be maintained in five different databases. The disparate number of databases associated with various distributed objects raises implementation issues regarding operations to be performed on copies of the distributed objects. It would be desirable if the methods used to perform operations on various objects would be the same no matter how many copies of the distributed object existed in the distributed system.

SUMMARY OF THE INVENTION

The invention takes advantage of polymorphism to allow redundant database operations in a distributed object system in a way that is essentially transparent. One aspect of the invention is a method for managing redundant objects in a distributed object system. A transaction service runs on a computer and at least two copies of the instance variables of a distributed object are maintained. Each copy of the instance variables is stored in a separate database and the distributed object comprises a polymorphism of an interface object instantiation method. At least two copies of an interface object are instantiated where each interface object is associated with one of the copies of the instance variables of the distributed object. The interface objects are instantiated using the polymorphism. A list of interface objects is maintained with the distributed object. Each copy of the instance variables of the distributed object may be modified by traversing the list of interface objects and sending a message with modification parameters to each interface object on the list.

The invention has several important technical advantages. With little effort, an application developer can develop applications for a distributed object system to easily perform operations in multiple databases simultaneously. The application developer can do so even where the databases vary in interface and organization. The invention allows multiple simultaneous operations on redundant distributed objects no matter how many copies of the object are maintained in a distributed system. In other words, the same methods may be used to perform these redundant operations no matter how many copies of the distributed object exist.

The invention also employs a persistence service that makes persistency and the actual interface to various databases in a distributed system transparent to the application developer. The ability to use identical methods for performing redundant operations on multiple copies of distributed objects speeds up application development as the application developer need not worry about the number of redundant objects being effected by a particular operation. Thus, the invention allows complex database transactions to be handled easily.

BRIEF DESCRIPTION OF THE DRAWINGS

For a more complete understanding of the present invention and the advantages thereof, reference is now made to the following descriptions, taken in connection with the accompanying drawings, in which.

DETAILED DESCRIPTION OF THE INVENTION

Figure 1:
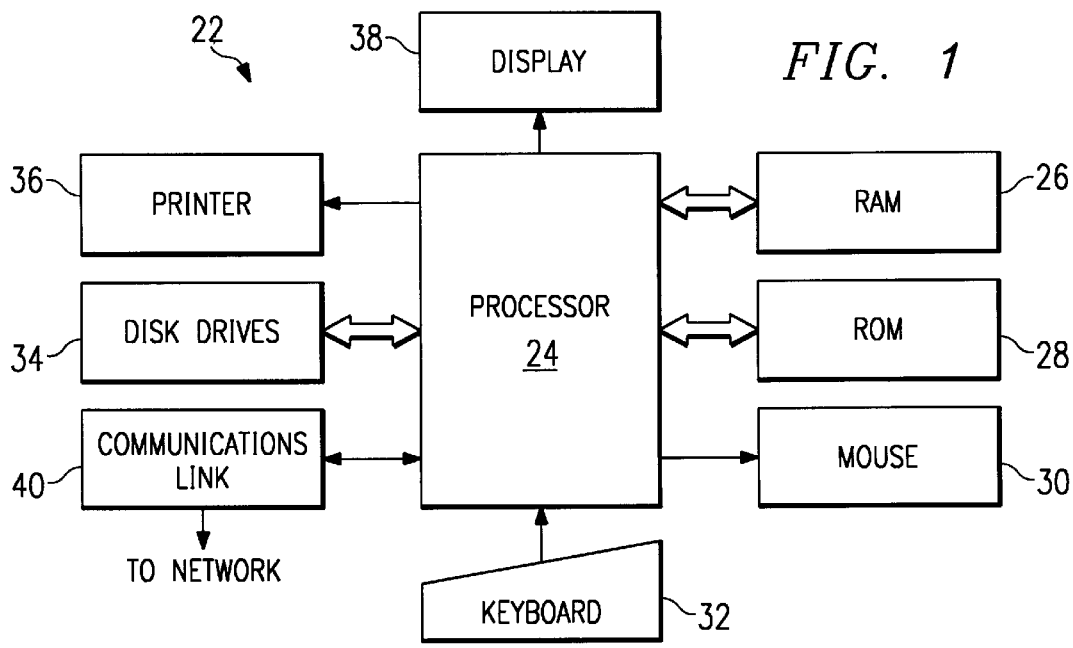
FIG. 1 illustrates a general purpose computer that may be used to implement the present invention.
Figure 2:
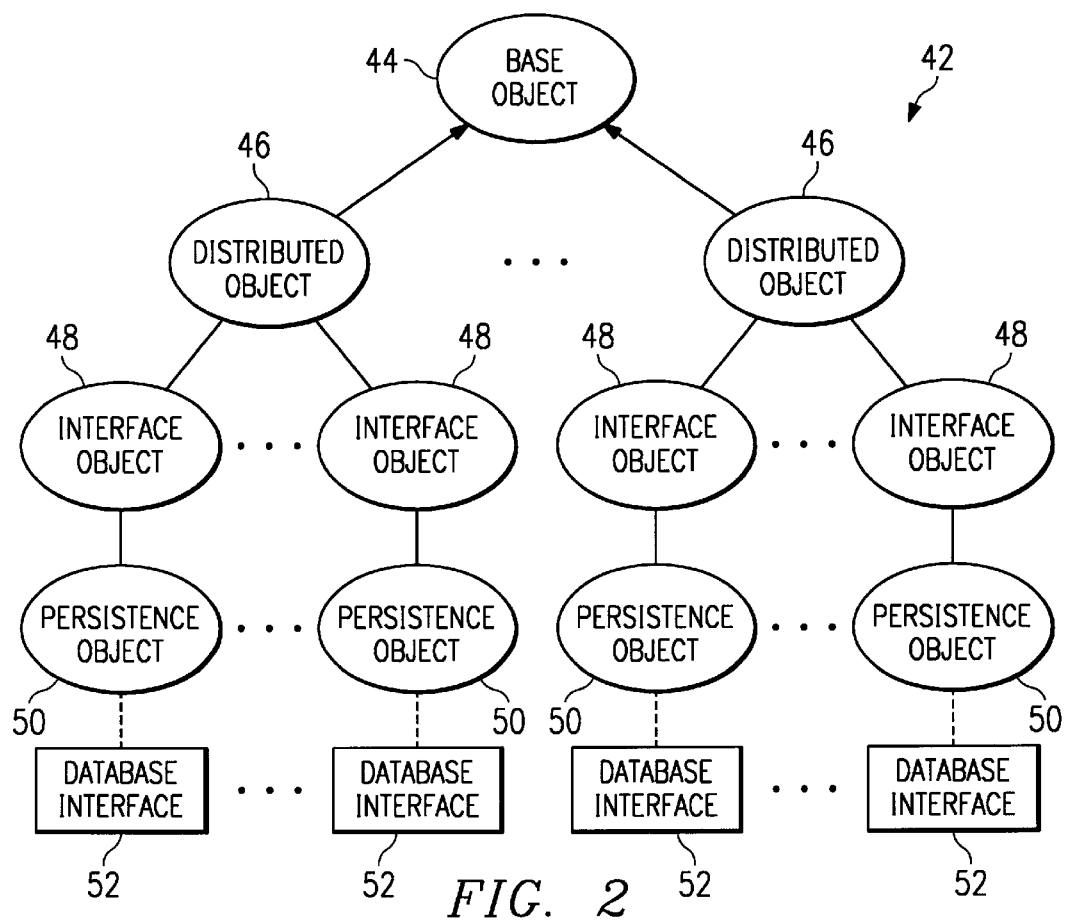
FIG. 2 illustrates an object diagram of a portion of an exemplary distributed system constructed in accordance with the invention.
Figure 3:
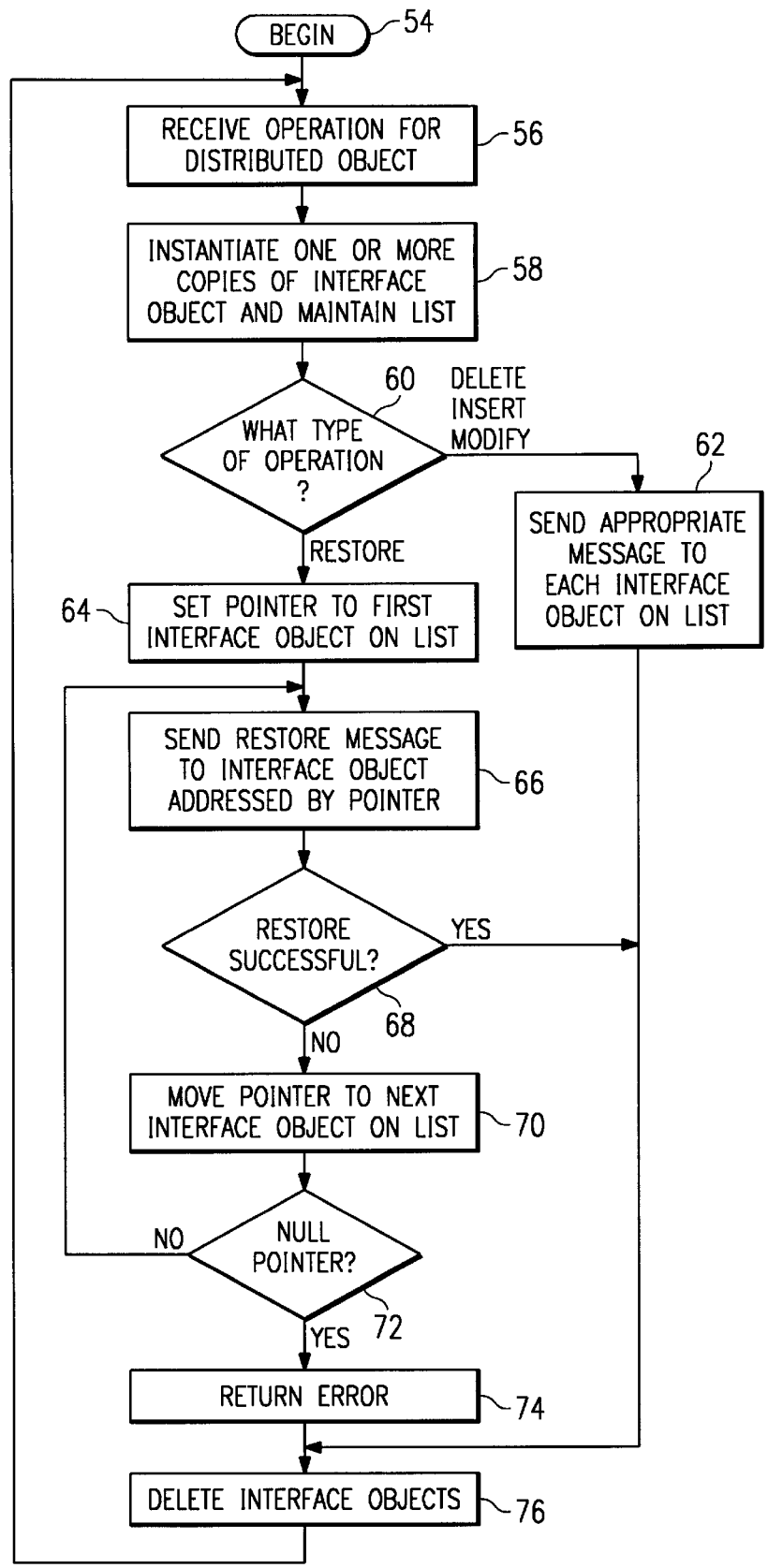
FIG. 3 illustrates a flowchart describing the operation of a distributed system constructed in accordance with the invention.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used in a distributed system created in accordance with the invention. The general purpose computer 22 may be used to execute distributed applications and/or distributed system services in accordance with the invention. General purpose computer 22 may be adapted to execute any of the well-known MS-DOS, PC-DOS, OS2, UNIX, MAC-OS and WINDOWS operating systems or other operating systems. General purpose computer 22 comprises processor 24, random access memory (RAM) 26, read only memory (ROM) 28, mouse 30, keyboard 32 and input/output devices such as disk drives 34, printer 36, display 38 and communications link 40. The present invention includes programs that may be stored in RAM 26, ROM 28 or disk drives 34 and may be executed by processor 24. Communications link 40 connects to a computer network but could be connected to a telephone line, an antenna, a gateway, or any other type of communications link. Disk drives 34 may include a variety of types of storage media such as, for example, floppy disk drives, hard disk drives, CD-ROM drives or magnetic tape drives. Although this embodiment employs a plurality of disk drives 34, a single disk drive 34 could be used without departing from the scope of the invention. FIG. 1 only provides one example of a computer that may be used with the invention. The invention could be used on computers other than general purpose computers, as well as on general purpose computers without conventional operating systems.

FIG. 2 illustrates an object diagram of a portion of a distributed system 42 constructed in accordance with the invention. Before describing the details of the invention, a brief overview will be provided to clarify the discussion. For each database in which a redundant copy of a distributed object is stored, a separate database interface object is created. For example, if a distributed object is stored in four different databases, then four different interface objects will be created for that distributed object to interface with each of the four databases. These interface objects will be maintained in a list by the distributed object. When operations are to be performed on the distributed object, the list of interface objects is traversed. Interface objects may be instantiated when needed and deleted after use. The invention takes advantage of polymorphism to tailor interface object instantiation to particular distributed objects. This allows a framework of services for a distributed object system to treat each distributed object in the same way and frees the application developer from the need to tailor specific methods to specific distributed objects.

In the example illustrated in FIG. 2, the distributed system 42 comprises one instance of base object 44, one or more instances of distributed object 46, one or more instances of interface object 48 and one or more instances of persistence object 50. Each persistence object 50 may interface with a database interface 52.

Each database interface 52 may provide an interface to a particular type of database. Database interface 52 could be any type of common interface such as a dynamic link library or an application program interface (API). Each database could be organized differently and could be relational, object oriented, hierarchical, or network databases, Any type of database and any type of database interface 52 can be used without departing from the scope of the invention.

Each distributed object 46 inherits from a base object 44. Base object 44 may include one or more methods provided by a low level framework used to provide various services in a distributed object system. In this embodiment, base object 44 comprises an instantiation method for interface objects. This default interface object instantiation method is designed to create a list of interface objects associated with a distributed object. In the default method, a single interface object will be created for the distributed object. In other words, the default interface object instantiation method is designed for a distributed object that is stored only in a single database.

In this embodiment, however, each distributed object 46 is stored in multiple databases. Accordingly distributed object 46 will be associated with at least one interface object 48 for each database in which it is stored. The invention takes advantage of polymorphism to redefine the interface object instantiation method in distributed object 46. Distributed object 46 comprises an interface object instantiation method that is a polymorphism of the interface object instantiation method that is defined in base object 44. The interface object instantiation method could be defined in another object from which base object 44 inherits. In this embodiment, the interface object instantiation method is initially declared in a framework object (not explicitly shown) from which base object 44 inherits. The polymorphism of the interface object instantiation method is written by the application developer to create at least one interface object 48 for each database in which distributed object 46 is stored.

Each interface object 48 may provide a generic interface to any type of database. Each interface object 48 may, in turn, interface with a persistence object 50. Multiple interface objects 48 may share a persistence object 50. Persistence object 50 interfaces with particular database interfaces 52 and provides a persistence service to maintain the persistence of the copies of the instance variables of distributed object 46. This application uses the term "instance variables" to refer to the instance variables of an object whether stored in memory or in databases. When one or more copies of the instance variables are stored in a database, the instance variables are sometimes also referred to as object data. Any type of persistence object 50 could be used without departing from the scope of the invention. Similarly, the functions of database interface 52 and persistence object 50 could all be provided by methods of interface object 48. Alternatively, additional objects could be used to perform various additional functions associated with database operations. In addition, the functions of persistence object 50 and database interface 52 could be combined. Thus, interface object 48 may serve as a common interface to heterogeneous databases but the details of how operations occur after an operation is sent to interface object 48 may vary depending upon the particular implementation of the invention.

Turning to FIG. 3, the operation of the invention will now be described. In step 54, the operation of distributed system 42 begins with system initialization. In step 56, an operation is received for a particular distributed object 46. In step 58, one or more copies of an interface object 48 are instantiated and maintained in a list. In this embodiment, a separate interface object 48 is instantiated for each database in which the distributed object 46 is maintained.

In step 60, it is determined what type of operation is to be performed on the distributed object 46. If the distributed object 46 is to be deleted or modified, or if a new distributed object 46 is to be inserted into a database, then, in step 62, an appropriate message is sent to each interface object 48 on the list of interface objects.

Returning to step 60, if the instance variables of a distributed object 46 are to be restored to memory, then in step 64 a pointer is set to the first interface object on the list. In step 66, a restore message is sent to that first interface object 48 that is addressed by the pointer. In step 68 it is determined if the restore was successful. If so, then the method proceeds to step 76. If not, then the pointer is moved to the next interface object on the list in step 70. A separate pointer need not necessarily be maintained. Instead, the next interface object on the list could be retrieved from the list. In addition, any type of mechanism could be used to keep track of the interface objects 48 on the interface object list. In step 72, it is determined whether the pointer is now a null pointer. If not, then the method proceeds to step 66. If so, then an error message is returned in step 74 as the attempt to restore the objects to memory was unsuccessful. Following step 74, the copies of the interface objects 48 are deleted in step 76. Such deletion frees up memory until the next time an operation is to be performed on a distributed object 46. Alternative embodiments of the invention may cache the interface objects 48 to save time in reloading frequently used interface objects 48.

Thus, the invention allows a convenient method for performing operations on distributed objects stored in multiple databases. Whenever an object is to be deleted from a database, inserted into a database, or modified in a database, the distributed object is sent the appropriate command, the distributed object instantiates an instance of an interface object 48 for each database in which it is stored and traverses that list to perform the operation on each copy of the distributed object 46. If the object is simply to be restored to memory, then an instance of an interface object 48 is instantiated for each database in which the distributed object 46 is stored and the list is traversed until one copy of the instance variables is successfully retrieved from the database. Following completion of any of these operations, the interface objects 48 are deleted until another operation is to be performed on a distributed object 46.

Of course, the appropriate data is included as parameters along with a command to perform a particular operation. For example, in an insert or modify operation, the instance variables for the distributed object to be inserted into a database or the parameters to be modified are included with the operation message.

In this particular embodiment, delete, insert and modify operations may be requested by a transaction service comprising a portion of a framework for distributed objects that may be used with the present invention. The transaction service would generate delete, insert and/or modify messages and send them to particular distributed objects 46. The sending of these messages with particular operations causes the distributed objects 46 to instantiate one or more copies of an interface object 48 and maintain them on a list.

Although the present invention has been described in detail, it should be understood that various changes, substitutions, and alterations can be made hereto without departing from the spirit and scope of the invention as defined by the appended claims.

What is claimed is:

1. A system for managing redundant objects in a distributed object system for use with a computer, comprising:

at least two copies of the instance variables of a distributed object, each copy stored in a separate database, the distributed object comprising a polymorphism of an interface object instantiation method;

wherein a transaction service running on the computer is operable, in response to a transaction request, to cause instantiation of at least two copies of an interface object by sending a message to the distributed object, each interface object associated with one of the copies of the instance variables of the distributed object, wherein the interface objects are instantiated using the polymorphism and maintained in a list by the distributed object; and wherein the distributed object is operable, in response to the transaction request, to modify each copy of the instance variables of the distributed object by traversing the list of interface objects and sending a message with modification parameters to each interface object on the list.

2. The system of claim 1, wherein the transaction service is further operable, in response to a second transaction request, to cause instantiation of at least two copies of a new interface object by sending a message to a new distributed object, each new interface object associated with a copy of the instance variables of the new distributed object, wherein the new interface objects are maintained in a new list by the new distributed object; and wherein the new distributed object is further operable, in response to the second transaction request, to create at least two copies of the instance variables of the new distributed object by traversing the new list of interface objects and sending an insert message containing parameters corresponding to the instance variables for the new distributed object to each new interface object on the new list.

3. The system of claim 1, wherein the distributed object is further operable to restore a copy of the instance variables of the distributed object to memory by traversing the list of interface objects, sequentially sending a restore message to each interface object on the list, waiting for a set of instance variables to be returned to the interface objects from one of the databases, and restoring the distributed object to memory using the first set of instance variables successfully retrieved by one of the interface objects.

4. The system of claim 1, wherein the distributed object is further operable, in response to a third transaction request, to delete each copy of the instance variables of the distributed object by traversing the list of interface objects and sending a delete message to each interface object on the list.

5. The system of claim 2, wherein the distributed object is further operable to restore a copy of the instance variables of the distributed object to memory by traversing the list of interface objects, sequentially sending a restore message to each interface object on the list, waiting for a set of instance variables to be returned to the interface objects from one of the databases, and restoring the distributed object to memory using the first set of instance variables successfully retrieved by one of the interface objects.

6. The system of claim 5, wherein the distributed object is further operable, in response to a third transaction request, to delete each copy of the instance variables of the distributed object by traversing the list of interface objects and sending a delete message to each interface object on the list.

7. A system for managing redundant objects in a distributed object system, comprising:

a computer readable medium;

at least two copies of the instance variables of a distributed object, each copy stored in a separate database, the distributed object comprising a polymorphism of an interface object instantiation method;

wherein a transaction service stored on the computer readable medium is further operable, in response to a transaction request, to cause instantiation of at least two copies of an interface object by sending a message to the distributed object, each interface object associated with one of the copies of the instance variables of the distributed object, wherein the interface objects are instantiated using the polymorphism and maintained in a list by the distributed object; and wherein the distributed object is operable, in response to the transaction request, to modify each copy of the instance variables of the distributed object by traversing the list of interface objects and sending a message with modification parameters to each interface object on the list.

8. The system of claim 7, wherein the transaction service is further operable, in response to a second transaction request, to cause instantiation of at least two copies of a new interface object by sending a message to the distributed object, each new interface object associated with a copy of the instance variables of a new distributed object, wherein the new interface objects are maintained in a new list by the new distributed object; and wherein the new distributed object is further operable, in response to the second transaction request, to create at least two copies of the instance variables of the new distributed object by traversing the new list of interface objects and sending an insert message containing parameters corresponding to the instance variables for the new distributed object to each new interface object on the new list.

9. The system of claim 7, wherein the distributed object is further operable to restore a copy of the instance variables of the distributed object to memory by traversing the list of interface objects, sequentially sending a restore message to each interface object on the list, waiting for a set of instance variables to be returned to the interface objects from one of the databases, and restoring the distributed object to memory using the first set of instance variables successfully retrieved by one of the interface objects.

10. The system of claim 7, wherein the distributed object is further operable, in response to a third transaction request, to delete each copy of the instance variables of the distributed object by traversing the list of interface objects and sending a delete message to each interface object on the list.

11. The system of claim 8, wherein the distributed object is further operable to restore a copy of the instance variables of the distributed object to memory by traversing the list of interface objects, sequentially sending a restore message to each interface object on the list, waiting for a set of instance variables to be returned to the interface objects from one of the databases, and restoring the distributed object to memory using the first set of instance variables successfully retrieved by one of the interface objects.

12. The system of claim 11, wherein the distributed object is further operable, in response to a third transaction request, to delete each copy of the instance variables of the distributed object by traversing the list of interface objects and sending a delete message to each interface object on the list.

13. A method for managing redundant objects in a distributed object system, comprising:

running a transaction service on a computer;

maintaining at least two copies of the instance variables of a distributed object, each copy stored in a separate database, the distributed object comprising a polymorphism of an interface object instantiation method;

instantiating at least two copies of an interface object, each interface object associated with one of the copies of the instance variables of the distributed object, wherein the interface objects are instantiated using the polymorphism;

maintaining a list of the interface objects with the distributed object;

modifying each copy of the instance variables of the distributed object by traversing the list of interface objects and sending a message with modification parameters to each interface object on the list.

14. The method of claim 13, further comprising:

instantiating at least two copies of a new interface object, each new interface object associated with a copy of the instance variables of a new distributed object, maintaining a new list of the new interface objects using the new distributed object; and creating at least two copies of the instance variables of the new distributed object by traversing the new list of interface objects and sending an insert message containing parameters corresponding to the instance variables for the new distributed object to each new interface object on the new list.

15. The method of claim 13, further comprising:

restoring a copy of the instance variables of the distributed object to memory by traversing the list of interface objects, sequentially sending a restore message to each interface object on the list, waiting for a set of instance variables to be returned to the interface objects from one of the databases, and restoring the distributed object to memory using the first set of instance variables successfully retrieved by one of the interface objects.

16. The method of claim 13, further comprising:

deleting each copy of the instance variables of the distributed object by traversing the list of interface objects and sending a delete message to each interface object on the list.

17. The method of claim 14, further comprising:

restoring a copy of the instance variables of the distributed object to memory by traversing the list of interface objects, sequentially sending a restore message to each interface object on the list, waiting for a set of instance variables to be returned to the interface objects from one of the databases, and restoring the distributed object to memory using the first set of instance variables successfully retrieved by one of the interface objects.

18. The method of claim 17, further comprising:

deleting each copy of the instance variables of the distributed object by traversing the list of interface objects and sending a delete message to each interface object on the list.

* * * * *